United States Patent [19]
Johnson et al.

[11] 3,860,125
[45] Jan. 14, 1975

[54] TRIM SEPARATION

[75] Inventors: Roger E. Johnson, Westland; Joe Y. Sawai, Dearborn Heights, both of Mich.

[73] Assignee: Ford Motor Company, Dearborn, Mich.

[22] Filed: June 8, 1973

[21] Appl. No.: 368,399

[52] U.S. Cl. ............... 214/1 BH, 198/261, 198/262, 214/1 S
[51] Int. Cl. .............................................. B66c 1/02
[58] Field of Search ...... 214/1 BS, 1 BT, 1 BH, 1 S, 214/1 B; 198/261, 262, 283

[56] References Cited
UNITED STATES PATENTS
| | | | |
|---|---|---|---|
| 3,601,264 | 8/1971 | Ritter | 214/1 BH |
| 3,785,507 | 1/1974 | Wiesler | 214/1 BH |

*Primary Examiner*—Robert J. Spar
*Assistant Examiner*—George F. Abraham
*Attorney, Agent, or Firm*—Joseph W. Malleck; Keith L. Zerschling

[57] ABSTRACT

An automated glass cutting and finishing line is disclosed having stations for glass scoring, stripping and prepositioning for pickup so the glass may be carried to a grinding or edge treating station. The prepositioning station is provided with a mechanism for raising a glass template above the trim pieces, the mechanism operates through a flexible canvas conveyor belt used to support the glass between and in the stations as well as permit permeation of vacuum pressure. Another mechanism is adapted to sense the existence of glass defects and hangers as the template arrives in the raised plane; the latter mechanism relocates the template in the raised plane to a new predetermined position for accurate pickup by a mechanical robot engaging the template only through the use of suction cups. The robot places the template on another suction-type holding mechanism which rotates the template for full edge grinding.

6 Claims, 16 Drawing Figures

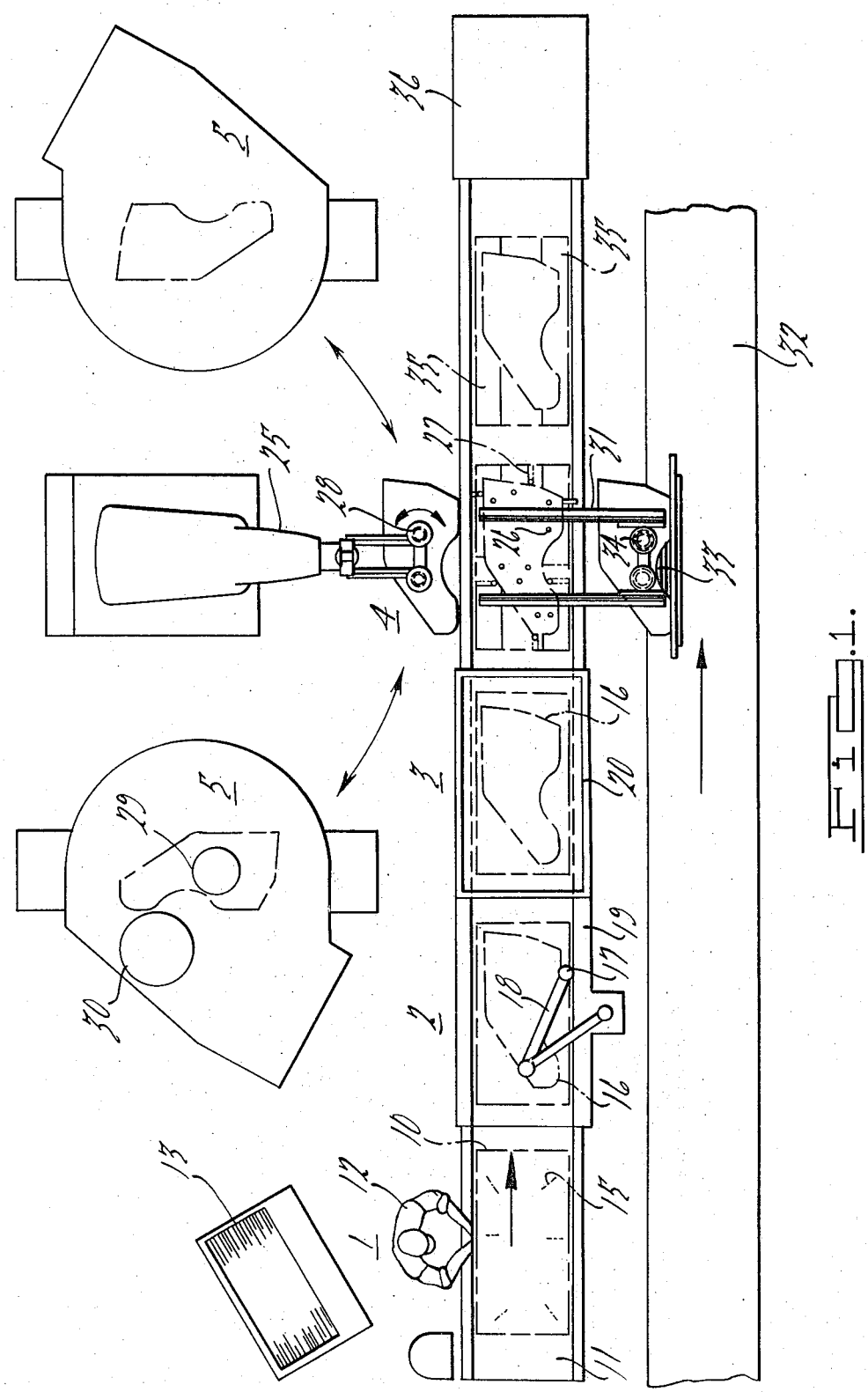

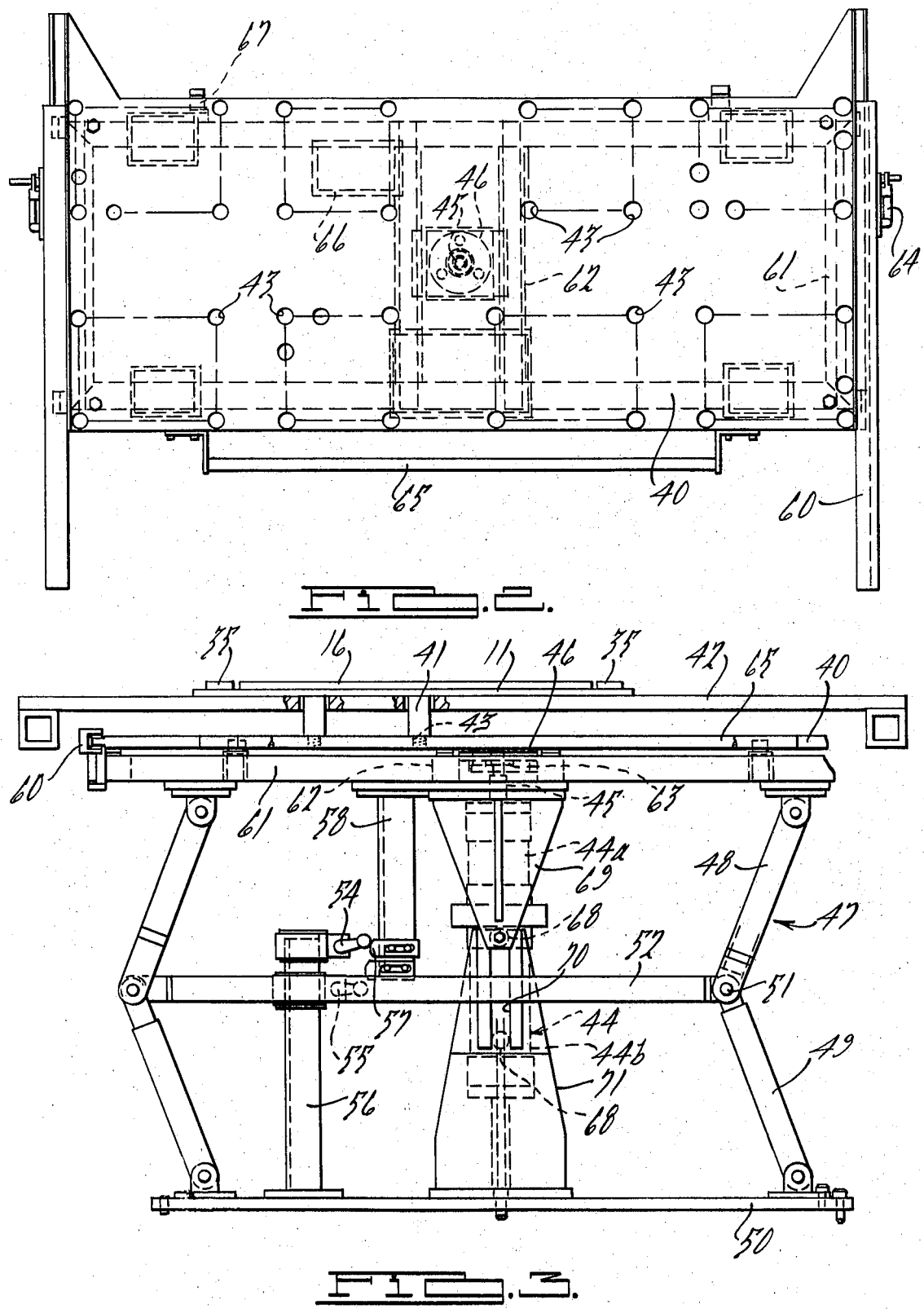

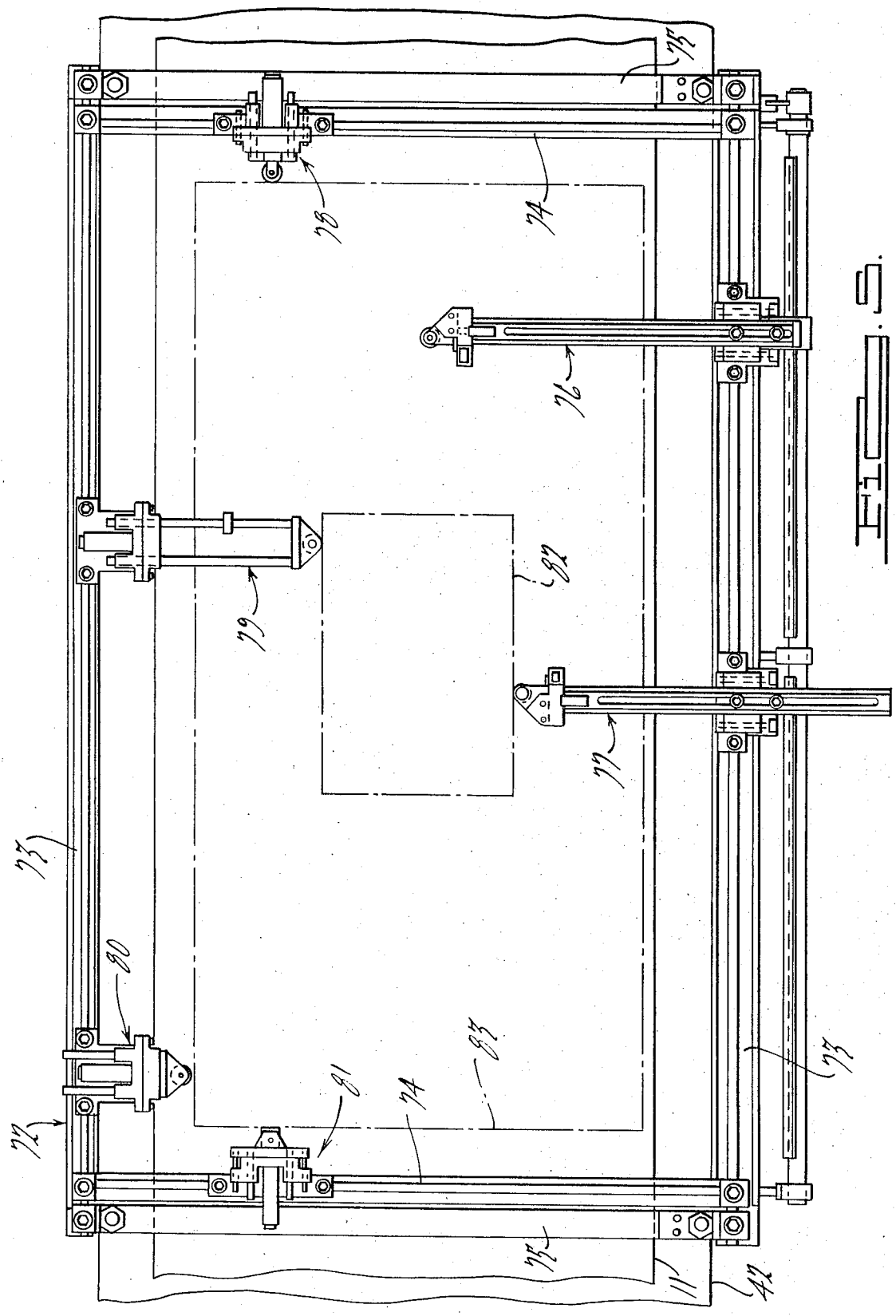

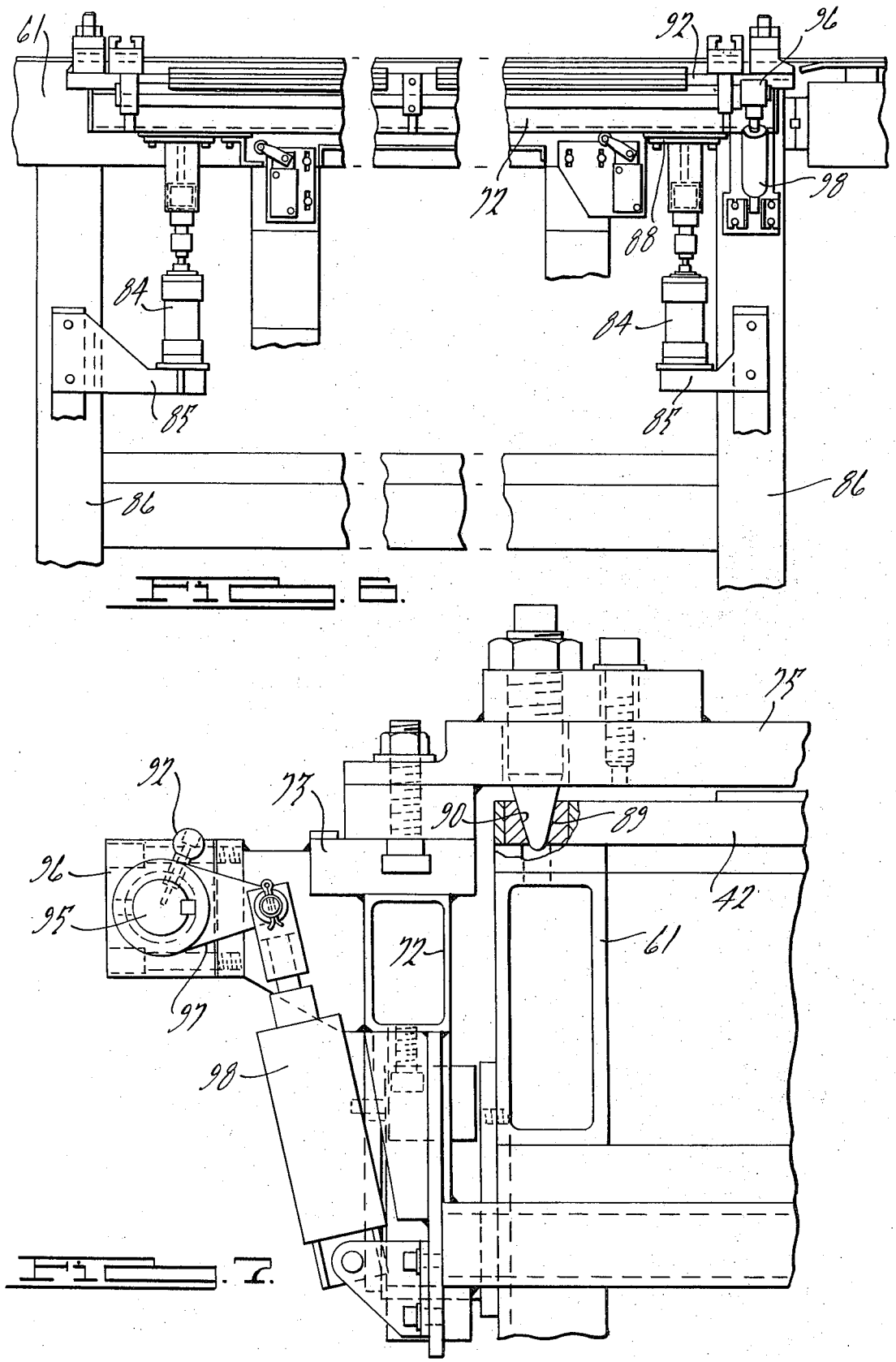

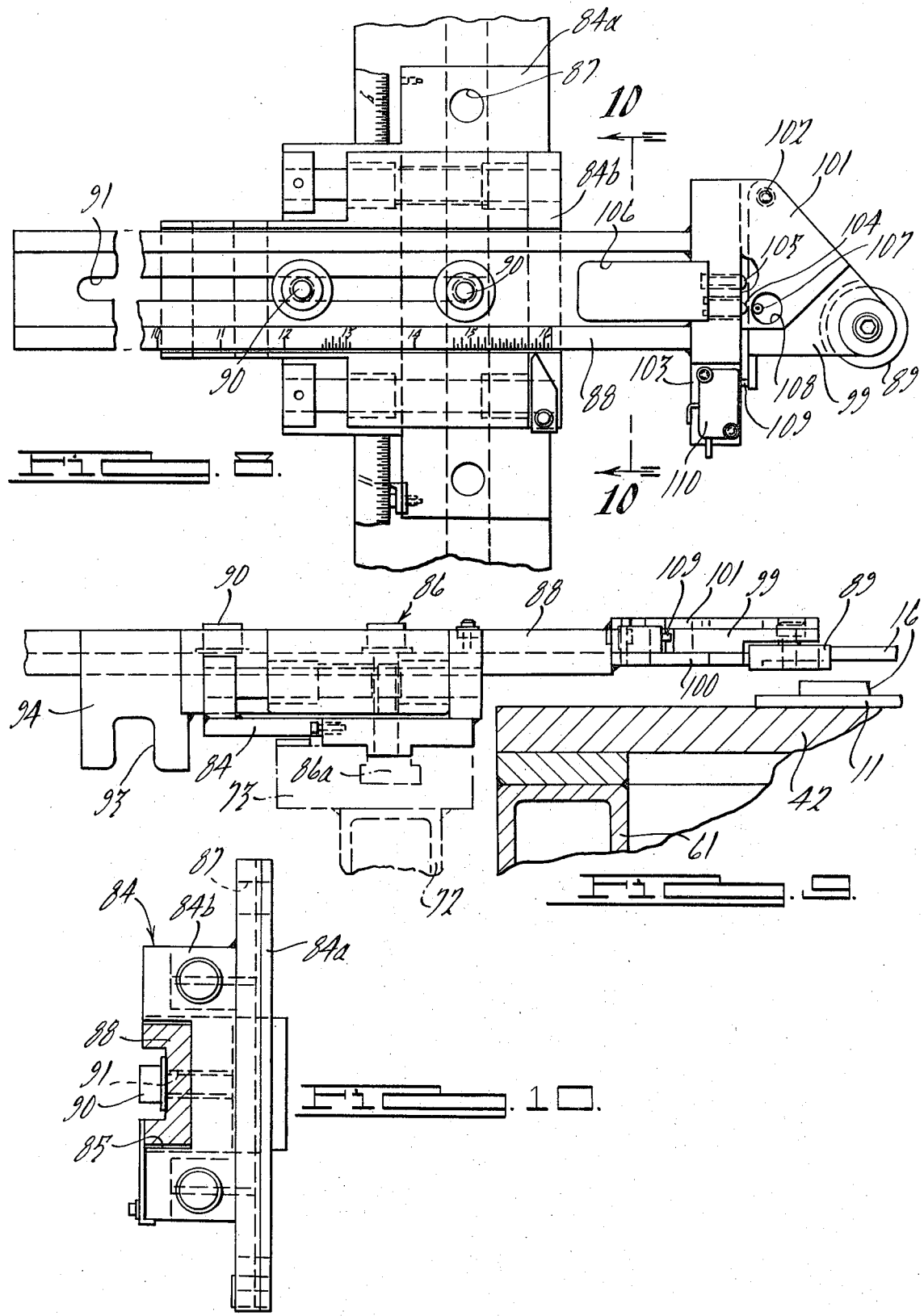

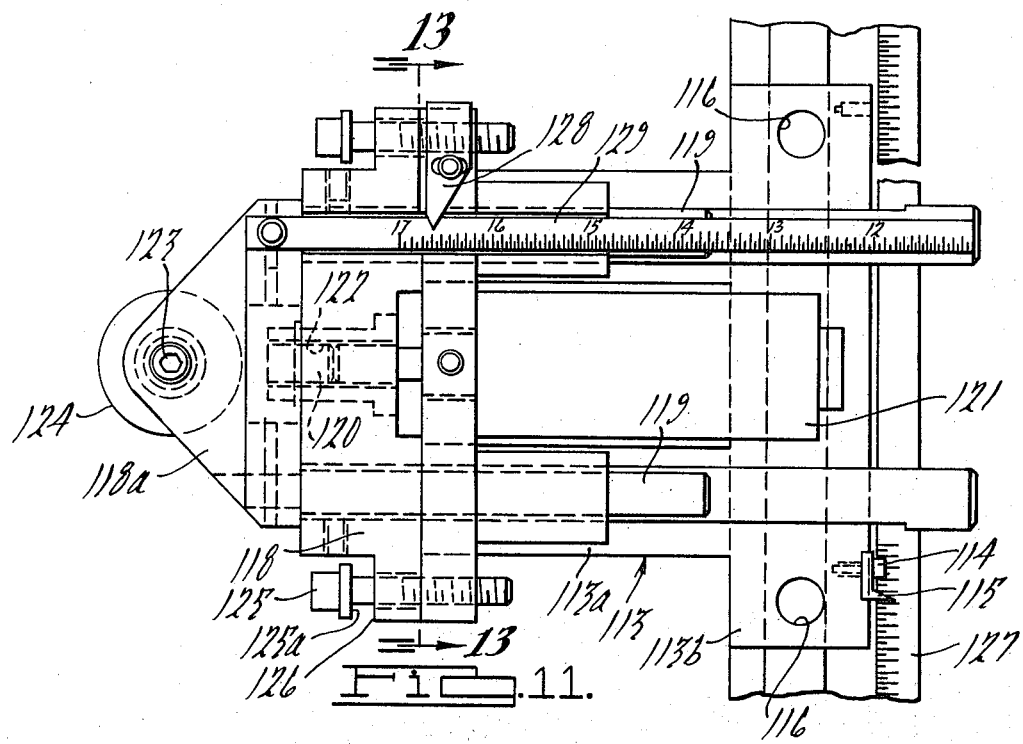
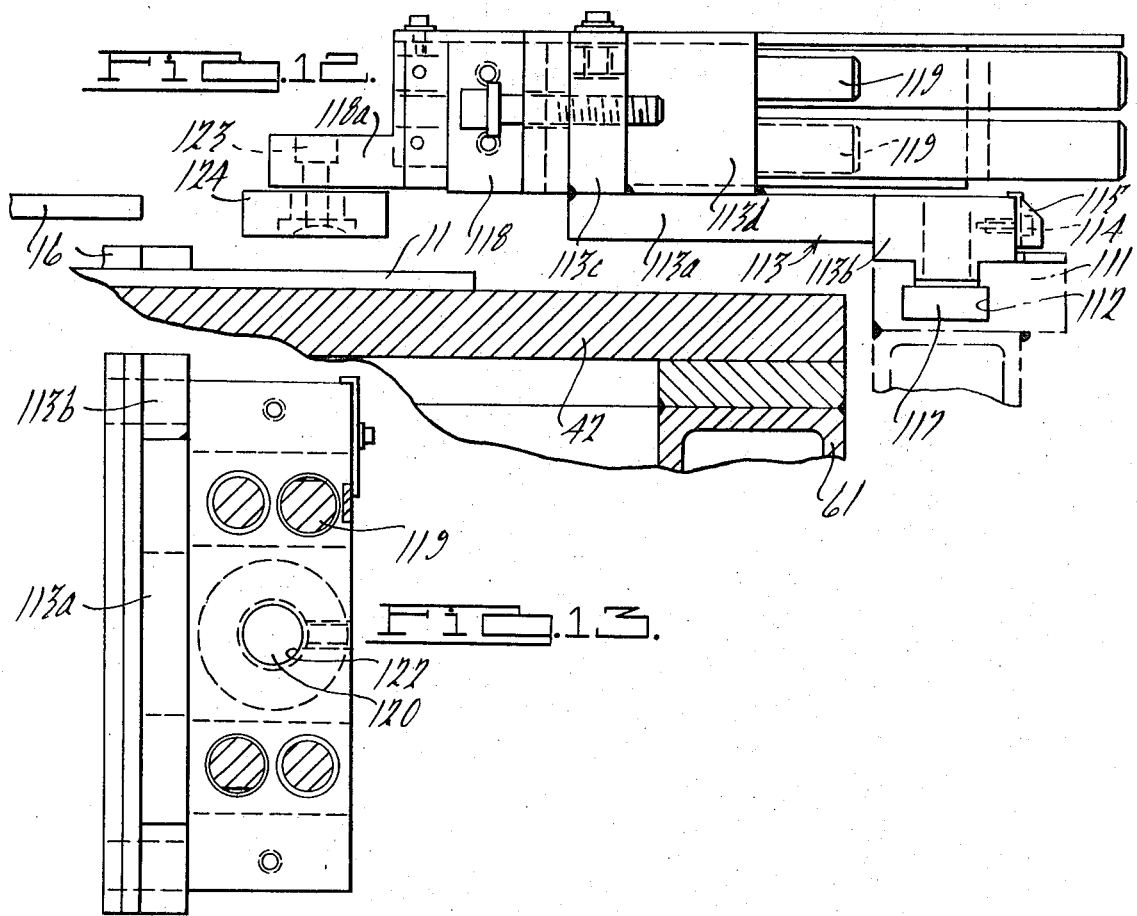

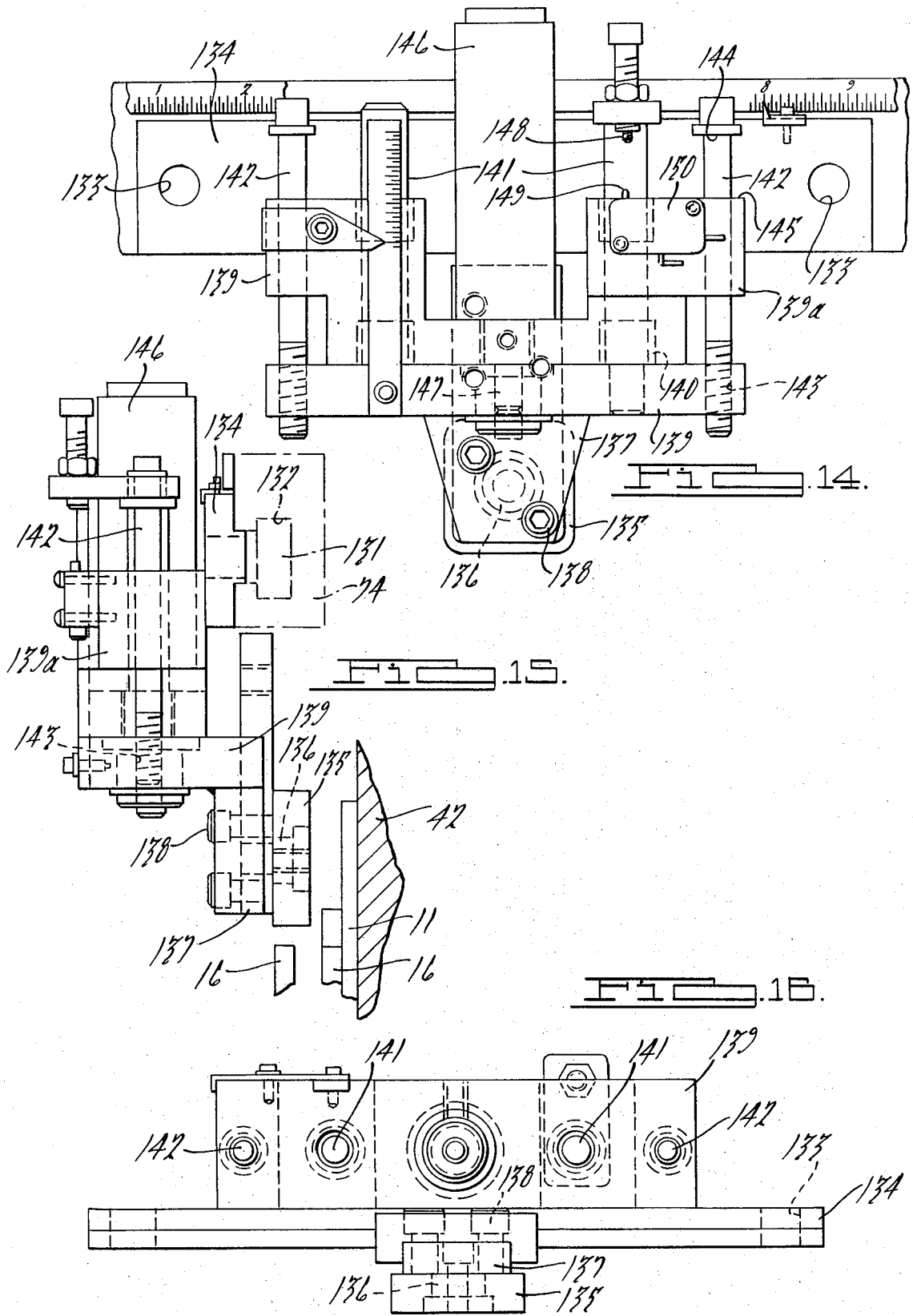

3,860,125

TRIM SEPARATION

BACKGROUND OF THE INVENTION

Heretofore, certain steps of a glass cutting line have been mechanically carried out, but have required a controller for positioning of the work piece as well as observation and manual monitoring of defects. An example of the degree of automation utilized for glass cutting lines is illustrated in U.S. Pat. Nos. 3,520,457, 3,532,259 and 3,520,456. Most noted in the prior art lines is the close adherence to a straight in-line system with total reliance upon a manual operator for taking the cut template and performing subsequent operations. Total automation of a glass cutting line has been an important goal for several reasons: increased output can result if the line rate is not limited to manual observation and control; the cost per piece can be reduced substantially; and keener sensing of defects can be assured at faster rates than that obtained by manual operation.

One of the principal problems with automating a glass cutting and grinding line, is a differential production rate between current grinding equipment and glass cutting equipment. This necessitates out of line positioning of the grinding equipment relative to the cutting equipment and requires mechanical means for transporting the workpiece between these different stations. Mechanical equipment that is capable of carrying the workpiece between such stations requires precise pick-up positioning so that the same equipment can locate the workpiece for the grinding equipment without the need for manual inspection. The transporting mechanism (using a desirable canvas belt permeated by vacuum) for the glass cutting portion of the line is not sufficient to retain accurate location of the glass for automatic transportation to the grinding equipment.

Another principal problem is the possibility of damage to the grinding equipment that may result by improper cutting and stripping performed in the in-line portion of the process. For a machine cutting and grinding line to become completely automated, the consistency of the cutting and stripping must be mechanically monitored so that improperly stripped parts will not impede the flow of parts or damage the downstream equipment. For design purposes, the automatic cutting line is considered to be no greater than 95 percent reliable and the failure will be manifested at the prepositioning station by having edge-trim connected to the glass template, called glass hangers. Other defects may arise either in connection with electrical or mechanical failures. For example, the cutting wheel may have become worn through continuous use and thereby result in inadequate scoring. A vent score particularly may open into the template resulting in a missing corner or broken template. The vent cutting wheels and resulting scores are contemplated to be somewhat less reliable than 100 percent and therefore it is inevitable that some trim will occasionally be slightly affixed to the template. Accordingly, it is important that such defects be sensed by the in-line equipment before transfer of the workpiece to the grinding station. Mechanical equipment must be provided that will remove lightly attached edge trim from the template prior to the placement in the grinder; trim that is rigidly attached to the template must be sensed by such equipment to prevent downstream damage.

SUMMARY OF THE INVENTION

A principal object of this invention is to provide an improved apparatus which is effective to receive cut-glass brackets, separate the template from the trim and sense for imperfect severance as well as other defects in the glass template.

Still another object of the invention is to provide an apparatus which is effective to receive a glass template from an in-line cutting operation and precisely locate the template for pick-up by a mechanical robot for carriage to an off-line grinding station.

Yet still another object of this invention is to provide an automated glass cutting and grinding line which is effective to increase the rate of production over that known today, reduce the defects and flaws resulting from such a glass operation, and provide full automated edge grinding treatment to the glass template for reduction in breakage during service.

BRIEF DESCRIPTION OF THE DRAWINGS

FIG. 1 is a schematic layout of a glass cutting and finishing line embodying the principles of this invention;

FIG. 2 is a plan view of a glass separating table embodying a part of the invention herein;

FIG. 3 is a front elevational view of the apparatus of FIG. 2;

FIG. 5 is a plan view of a guaging and prepositioning apparatus embodying another part of the invention herein;

FIG. 6 is a front elevational view of the apparatus of FIG. 6, having certain portions thereof broken away;

FIG. 7 is an enlarged side elevational view of a portion of the apparatus illustrated in FIG. 6, certain portions thereof being shown in cross-section.

FIG. 8 is a greatly enlarged plan view of one of the front guaging devices illustrated in FIG. 5;

FIG. 9 is a front elevational view of the apparatus shown in FIG. 8 having certain portions thereof broken away;

FIG. 10 is a sectional view taken substantially along line 10—10 of FIG. 8;

FIG. 11 is a greatly enlarged plan view of a rear guaging device illustrated in FIG. 5;

FIG. 12 is a front elevational view of the apparatus in FIG. 11;

FIG. 13 is a sectional view taken substantially along line 13—13 of FIG. 11;

FIG. 14 is a greatly enlarged plan view of a leading guaging device as illustrated in FIG. 5.

FIG. 15 is a side elevational view of the apparatus shown in FIG. 14; and

FIG. 16 is a front elevational view of the apparatus shown in FIG. 14.

DETAILED DESCRIPTION

Figure 4:
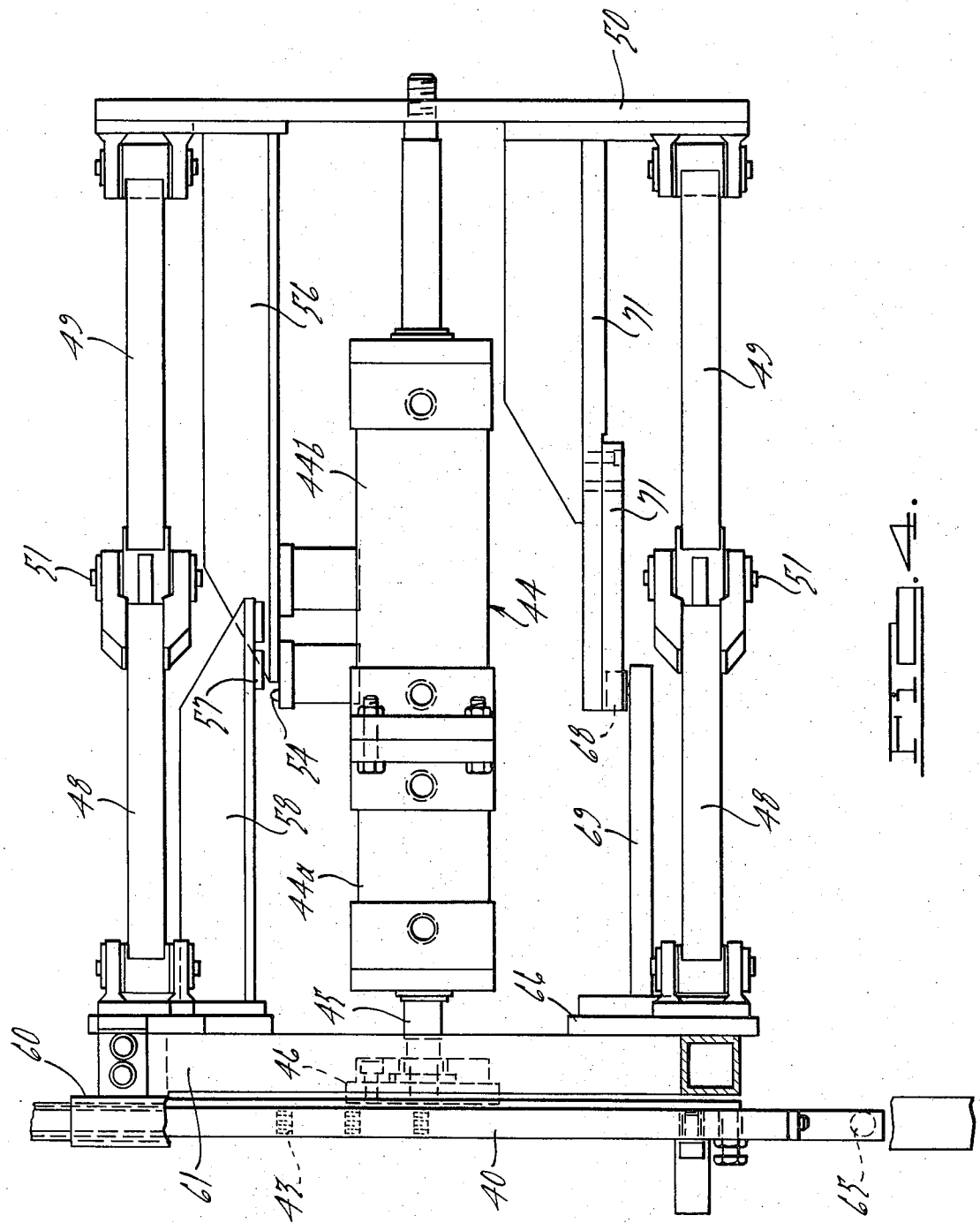
FIG. 4 is an enlarged side elevational view of the apparatus of FIG. 2.

In FIG. 1, there is illustrated an overall schematic sequence for a preferred method of scoring and cutting plate glass of the type which is useful in automotive vehicles. The method essentially comprises five distinct work stations along with auxiliary work areas for trim disposal, vertical washing and inspection. The following will proceed to discuss each of the essential work stations in sequence so as to give an overall review of a commercial cutting line within which the inventive improvement becomes a part thereof.

In station 1, a glass bracket 10 is manually loaded by an operator 12 from a supply 13 onto a porous canvas conveyer belt 11; gentle handling is facilitated by the use of floatation air directed upwardly through the conveyer belt to assist the operator in positioning the bracket against certain side and end stops (not shown). When located, the glass bracket edges contact limit switches which can be positioned on the side of the end stops. Upon such contact, floatation air is automatically turned off. The glass bracket, resting fully upon the conveyer belt, can now be worked upon by automatic equipment in station 1 (not shown), comprising an overhead scoring head which will apply a pattern of vent cuts 15 and may imprint a trademark upon the glass. When the automatic equipment completes its task, a signal is sent to a belt indexing circuit indicating that the station 1 is clear for the workpiece to be indexed to station 2.

In station 2, an intricate or compound template cut 16 may be impressed upon the glass bracket inside of the vent cuts 15 which have been previously applied in the first station. The bracket is vacuum clamped through the conveyer belt at the same time the pneumatic cutting head 17 (carried on a double pivot arm assembly 18) is lowered and a cutting oil solenoid is energized to supply cutting oil. The assembly 18 is carried upon a movable frame 19 which lowers down onto the belt about the glass bracket. On completion of the template scoring pattern, a signal is initiated to remove the air pressure to the cutting head as well as the vacuum which has been clamping the glass bracket to the belt. Additionally, a signal is sent to the belt index circuit indicating the template cutting station is clear for indexing the scored bracket to the vacuum stripping station 3.

In station 3, a mechanical frame 20, supporting a neoprene flexible diaphragm is lowered down onto the scored glass bracket. A seal ring is located on and about the four edges of the station bed. Vacuum is applied through holes in the stripping station bed plate and a wire mesh spacer distributes the vacuum upwardly through openings in a stripping aid and thus through the conveyer belt to act against the diaphragm. The diaphragm is sucked downwardly with sufficient force to bend the glass bracket at the scores. Bending stress is imparted to the glass bracket at predetermined locations by use of the stripping aid which defines fulcrum points or stress risers at which the uniform surface pressure of the diaphragm will cause bending. As the evacuation proceeds, atmospheric pressure against the top of the diaphragm will force the template into intimate contact with the conveyer belt such that the stress risers of the stripping aid will cause the template scores to open in advance of the vent scores. Upon completion of stripping, the vacuum supply valve will vent the stripping station connections to atmosphere; the diaphragm frame is then free to be raised clear of the glass bracket as well as the belt. As soon as the frame 20 is raised carrying the diaphragm, a signal is sent to the belt index circuit indicating that the stripping station is clear for movement to the station 4 for unloading and prepositioning.

In station 4, with the glass template surrounded slightly spaced from loose trim, a raising mechanism is employed beneath the canvas belt for elevating only the template 16. Certain problems are experienced in this particular portion of the commercial line and are related to the possibility of portions of the glass trim not being sufficiently severed from the glass template. Various circumstances can be responsible for the inability of a completely or accurately severed glass template such as: (a) inadequate cooling of the glass during manufacture such that local portions of the glass have a different cutting resistance, (b) small glass grit may become wedged within the scored groove preventing the scored locations to be in proper tension or compression as the case may require, and (c) gradual wear of the cutting or scoring wheel may give rise to inadequately scored glass. In addition and most significant, is the tendency for the glass bracket position to be slightly out of tolerance since the only mechanism holding the glass bracket in position is its ability to ride on the canvas belt and be clamped by vacuum at various locations along the line. In order for a mechanical robot 25 to operate with mechanical preciseness between station 4 and a grinding machine (station 5) which requires extreme accuracy in positioning for appropriate grinding, the glass bracket not only must be free of glass hangers, but must also be precisely located for pickup. To accomplish these dual goals and provide for a truly automated line, the invention herein provides an apparatus combination which overcomes these difficulties.

In station 4, the stripped bracket is elevated to a position above the severed trim. This is accomplished by an elevating plate which carries a plurality of fixed fingers 26 tailored for the specific template being cut. As the template is raised, a pattern of fixed and movable locators 27, in the raised plane, are adapted to engage the edges of the template and simultaneously determine the existence of glass hangers, remove them, and shift the glass template to a new predetermined position for reception by the mechanical robot 25. The mechanical robot, grasping the template only by way of suction cups 28, is then given a signal to remove the template and carry it to an out-of-line station 5 where an automatic grinding operation is carried out to give a full finished edge to the complete pattern of the template. The mechanical robot can position the template at either one of two grinding stations 5 to keep the flow of material going at a predetermined rate along the in-line cutting.

In station 5, the template is placed upon a rotatable apparatus 29 which, after determining the position of the template, will bring the arcuate edges of the template against a camming apparatus containing the grinding mechanism 30. Upon completion of the grinding step, the mechanical robot will reverse its rotation and carry the template back to a position above, but in line with the prepositioning station, where a conveyer belt 31 is available to move the completed glass bracket to a second in-line flow path 32 for accomplishing such auxiliary processing steps as vertical washing and inspection. The unload conveyer 31 indexes the template to a tip-up assembly 33 where it receives a signal that it is cleared for a new part. The tip-up assembly vacuum clamps the template by suction cups 34, rotates and waits for a clearance signal from the vertical washer conveyer (not shown). The suction cups are extended and the template is air blown followed by a deposit on path 32. With the suction cups 34 retracted and the tip-up assembly returned, it sends a signal to the unload conveyer to index the next template.

Separated trim 35 is indexed to the end of the conveyer belt 14 and falls into a collection bin 36.

Elevating Equipment

The principle evolved by this invention to overcome the prior art problems, comprises the use of a template elevating mechanism and an elevated gauging mechanism into which the glass template is urged by way of the elevating mechanism. The elevating equipment comprises a plate 40 having arranged thereon on array of pushers 41 each preferably about one inch in diameter and adapted to be threadably placed in a convenient pattern under the template area such that as the plate 40 is raised, only the area of the belt beneath the contoured template will be urged upwardly.

The template lift assembly is constructed so that the individual lift fingers can be relocated outside of the machine base by manually withdrawing the lift plate from the station area. The bed plate of station 4 contains an equal number of clearance holes to match the number of lift fingers or posts on the template lift plate. In the preferred embodiment, there is approximately 198 openings and finger locations, each spaced two inches apart in two directions of the lift plate plane. The normal lift travel for the plate is about five eighths of an inch which results in clearing the template from the trim by approximately three sixteenths of an inch.

The top of the fingers or pushers 41 are flush with the top of the station bed plate 42 when they are in the retracted position (as shown in FIG. 3). Each of the pushers or fingers 41 are threadably and selectively inserted in one of a pattern of threaded openings 43 arranged about the plate 40. Plate 40 is carried within a pair of edge tracks 60 for slide out removal. The tracks in turn are supported on a tubular horizontally disposed framework 61 having cross tubes 62. A double-acting hydraulic cylinder assembly 44 is arranged to operate centrally beneath the plate 40 and is connected to the framework 61 by slotted bracket 46 receiving a member 63 attached to the piston rod 45. One piston 44a of the assembly operates to elevate the plate 40 (preferably through a distance of about three fourths inch) and the other piston 44b operates to lower the plate 40 below the retracted position of piston 44a for clearing other structure. A detent latch 64 is used to lock the plate 40 in place in the tracks 60. A handle 65 is used during sliding movement of plate 40. An adjustable stop 67 limits sliding movement in one direction of plate 40.

To insure that the plate 40 maintains a horizontal position throughout its elevating movement, stabilizing linkage 47 is employed. The linkage comprises a pair of arms 48 and 49 at side of the mechanism; each arm has an end connected to a fixed pivot (either secured to the plate 40 or to a support plate 50) and an opposite end connected to a common pivot 51. Upon movement of plate 40 as actuated by the piston assembly, the linkage will move within a vertical plane along a side of the elevating apparatus. A cross bar 52 connects the common pivots of each of the stabilizing assemblies at each side so that they work in unison to assure the horizontal attitude. Limit controls for operating the piston assembly comprise an up-limit switch or control 54 and a down limit switch or control 55 mounted upon a support 56; a camming member 57 carried on a support 58 depending from a pad 66 attached to framework 61 moves the cam so that, when the plate has traversed the proper distance to allow the glass template to assume the predetermined raised plane, the up-limit control 54 will be actuated to indicate such for other mechanisms. Similarly, when the plate 40 is returned to its lowest starting position by piston 44a, lower limit control 55 will be actuated to indicate such to other mechanisms. Also a cam follower 68 is carried on a member 69 depending from framework 61; the follower rides in a slot 70 on a member 71 to assist in straight vertical movement of plate 40.

Gauging Mechanism

The gauging mechanism (shown in FIG. 5) is a combination sensing, trim removal and template relocation apparatus. Trim that is rigidly attached to the template is sensed by this equipment to prevent damage to the grinder. Also a template with a portion broken away is sensed so that the grind cycle will not start if the broken out section occurs at the location where the guaging mechanism will contact the template. It is preferable that such locations be at least three in number. However, a broken out section template which does not coincide with the areas of contact by the sensing mechanism is of no concern and need not be sensed by this equipment since it will not affect the grinder; it can be passed through the process to be culled out at some later inspection station. If the template is broken in the area surrounding the vacuum cups 28 as contacted by the robot, the brakes probably will cause a loss of vacuum, and a vacuum switch on the robot will signal equipment to cease operation and activate a warning device. The mechanism detects the excess glass or glass hangers to an accuracy of about plus or minus 1/30 of an inch at the locator points.

The gauging apparatus is supported on a lifting frame 72 comprised of tubular members rigidly formed into a rectangular configuration. On top of each longitudinal tube is a t-slotted bar 73; At the ends, transverse t-slotted bars 74 are attached as movable cross-pieces overlapping the bars 73. A rigid cross-piece 75 is used also at the extreme ends of bars 73 which is not movable and completes another frame with bars 73. Adjustable and pneumatically operable locator assemblies 76 and 77 are mounted on the rear bar 73; a leading edge locator assembly 78 is mounted on cross-bar 74 and cooperates with assemblies 76-77 to form a three-point reference for locating a corner of the template. Positioner assemblies 79 and 80 for the rear side of the template are mounted on front bar 73; rear edge positioner assembly is mounted on rear crossbar 74. The positioner assemblies are actuated to not only move into engagement with the other edges of the template, but continue moving so as to shift the template so that the far edges will contact the locator assemblies. The hypothetical rectangle 82 (in FIG. 5) represents the small template the gauging apparatus will accommodate and hypothetical rectangle 83 represents the largest template that can be accommodated.

The gauging apparatus is raised (for positioning of glass thereunder) by a plurality of vertically disposed hydraulic cylinders 84, each mounted by a bracket 85 on a leg 86 of the rigid supporting table structure for the in-line processing (which includes framework 61). The piston rods 87 are connected to pads 88 connected to tubular frame 72. To insure that frame 72 and overframe 73–75 relates accurately to the framework 61 when positioning is demanded, conically shaped locator pins 89 are adapted to nest in complimentary openings 90 on the framework 61.

The near side of the template or front side is located by a pair of positioning assemblies 76 and 77, each equipped with an individual sensor which will indicate a chipped or broken template. These positioning assemblies are operated through a common actuator to avoid one positioner contacting the template edge before the other. To this end, both positioners are connected individually by a common bar 93. The cross bar 93 is movable to and from the glass template by virtue of an actuating assembly which is comprised of a camming bar 92 carried for arcuate movement. An hydraulic piston 98 is located so as to have a tangential movement for contacting a link fastened to the actuator bar.

The nose of each of the positioners is equipped with a free rolling nylon wheel 89. The wheel is journalled in a bracket which in turn is supported by a plurality of extension bars each passing through a supporting block, the supporting block having a depending member to fit for sliding movement in a t-shaped slot of a lower track.

Each of the positioning assemblies has an air cylinder used for two purposes, namely, actuating the positioner to an end position and also having an end position limit switch. When not energized, it will indicate that there is excessive glass material attached to the template and the gauging mechanism will reject it as not acceptable for subsequent grinding. The positioner travel is here preferably limited to a ½ inch stroke and a resistance relay type sensor is used for indicating a chipped or broken template. The sensors have a sensing span of approximately plus or minus one eighth of an inch.

As shown in FIGS. 8-10, the front positioner assemblies 76 and 77 each comprise a slidable block 84 adapted to fit on top of the front t-slotted bar 73. The block may be fabricated from a flat steel plate 84a on which is welded a smaller stepped block 84b having defined therein a groove 85 transverse to the extent of bar 73. Threaded fasteners 86 having a t-shaped catch 86a extend through openings 87 and secure plate 84a at a selected position along bar 73. Adjustment in the other direction (transverse to bar 73) is provided by having the arm 88 (carrying the glass template contacting element 89) defined as a channel slidable in groove 85. Suitable threaded fasteners 90 insure the arm 88 is guided relative to the block 84.

A slot 91 is defined in arm 88 so that the predetermined stroke of element 89 may be carried out (arm 88 sliding in groove 85). The arms 88 of both assemblies 76 and 77 are actuated simultaneously for stroking by a camming bar 92 (see FIG. 7). Rod 92 is arcuately moved by a mechanical assembly 93; rod 92 fits within a slot 93 in the underside of member 94 attached to each of the arms 88. The assembly 93 comprises another larger bar 95 journalled for rotation about its own axis in a housing 96. An actuating arm 97, fixed to bar 95, is actuated for rotation by a hydraulic piston assembly 98 (mounted on a leg carried on the guaging apparatus to stop rods 111 attached to ride therewith).

The glass engaging element 89 is carried on arm 88 by way of a pivoted bracket 99 movable between two plates 100 and 101; the bracket is pivoted about pin 102 carried on said plates. The plates 100 and 101 are secured to a member 103 which in turn is welded on arm 88. A spring 104 is used to urge the bracket 89 toward the glass template; the spring must be overcome thereby providing a positive force signalling proper positioning of the template against the locator assemblies 79 and 80. In addition, the spring and bracket take up slightly oversized parts. A stop 105 limits the degree of movement against spring 104. Access opening 106 is provided to install the spring and stop. A limit pin 107 on bracket 99 operates within an opening 108 on plates 101. A switch 109 detects presence of glass against member 89 and transmits such signal pneumatically by way of means 110 to a logic control (not shown).

The far side locating assemblies 79 and 80 each have the engagement nose wheel on member 124 mounted on an axis which is vertically disposed, the axis being journalled in a bracket (extension 118a) which lies in a plane slightly above the nose wheel, the bracket being movably mounted upon an adjustable arm (block 118 on rods 119). An air cylinder 121 is mounted on the end of the arm for purposes of actuating the bracket between two positions of linear movement, approximately one fourth of an inch apart. The locator assemblies are adjustable in two directions.

In FIGS. 11-13, the construction of the rear locator assemblies 79 and 80 is shown in detail. Each assembly has a slide block 113 adapted to be adjustably carried on the t-slotted bar 73. Wing portions 113b of the block have a rib fitting into slot 112; portions 113b also have openings 116 receiving t-fasteners 117 for selectively locking the block at a desired location (as indicated by pointer 115 against scale 127, the pointer is secured by fastener 114 to portion 113b). Block 113 has an upright plate 113c and bosses 113d rising upwardly from horizontal portion 113a. A movable block 118 (carrying the template engaging member 124) is slidably supported on plate 113c by extension rods 119 (here four in number) received in aligned openings in the plate 113c and in the bosses 113d. The block 118 is actuated for movement by a pneumatic cylinder 121; the piston 120 of the cylinder is threadably engaged at 122 in the block 118. A horizontal extension 118a of block 118 carries pin 123 for rotatably supporting wheel or member 124 in the appropriate plane for engaging the edge of the template 16. The sliding movement of block 118 is limited by stop pins 125 having a surface 125a engageable by surface 126 of block 118.

The downstream side of the template is located with a locator assembly 78 also having a ¾ inch stroke or movement to a positive position. A square-faced nylon nose block 135 is carried on a journal pin 136 in a bracket (137 and 139) extending thereover, the bracket being movable for inward and outward adjustment. The bracket is supported upon a plurality of extension rods 141 and guide rods 142, the outside guide rods have stops to limit the linear movement of the bracket to a predetermined distance. The stop surfaces 144 can be changed by adjusting the threaded portions 143 of rods 142 relative to surface 145. A centrally located air piston 146 is utilized to provide the stroke. The locator assembly is carried on longitudinal and transversely adjustable tracks, one track being determined primarily by the extension rods 141, the other or lower track being defined by a t-shaped bar 74. A depending member 134 is effective to slide within the lower; a u-shaped block 139 is in turn welded to the member 134 for receiving the rods 141 and 142. The depending member 134 is locked in a selected position on bar 74 by t-shaped fasteners 131 received in slots 132 and extending through openings 133.

The presence of glass cutting defects causing the engagement wheel 135 not to be properly stroked is sensed by switch 150 having a switch element 149 which will not be actuated by stop 148. The switch 150 sends a signal to a central control (not shown). The use of a square-faced wheel 135 is particularly useful to engage pointed or sharply curved edges of the glass template; the locating force will be more effectively directed to the edge of the template.

In operation, the lifting plate raises the template to the plane of gauging, the locators and positioners will have been previously arranged within a general distance of about one fourth of an inch from the edge of the template prior to shifting. If there is lightly attached trim (which typically will be attached in large sections), the locator or positioning assemblies with the nose wheels will serve to apply additional stress and remove such large attached trim pieces. Trim that is rigidly attached to the template is sensed by the positioners. The engaging elements of the assemblies are typically arranged to engage those points of glass template that will be engaged by edge-holding assemblies in the grinding apparatus. This insures added mechanical efficiency.

Thus, the conditions met by the gauging apparatus are: (a) there is provision to remvoe lightly attached edge trim from the templates prior to their placement in a grinder, (b) only selected points on the periphery of the template are necessary for removal of lightly attached trim, providing such points can be changed during production to satisfy different cutting arrangements, and (c) trim that is rigidly attached to the template must be sensed by this equipment to prevent damage to the grinder. Trim is sensed at the unload station where the template can be prevented from placement in the grinder if necessary. A broken out section of the template, which does not coincide with the areas of contact made by the locators in the grinder, is of no concern and is sensed by this equipment since this will not affect the grinder and can be passed through the process to be culled out at an inspection station.

We claim:

1. In an apparatus having a continuous porous flexible membrane with one side for supporting and conveying glass brackets to a handling and separating station, each of said brackets having been previously cut and severed to define a template and trim, the improvement comprising:
    (a) means selectively acting against a side of said belt opposite from which said template and trim are supported, said means being effective to deform said belt upwardly in locations immediately beneath the template for thereby promoting a raised position of the template out of the plane of the trim;
    (b) means in said raised plane for sensing the presence of inadvertantly attached trim to said template at least at three locations about said template periphery, said sensing means being programmed to automatically shift said template to a predetermined position in said plane for accurate pick-up, and
    (c) mechanical means for picking up said raised template and for movably holding said template in a predetermined position for subsequent edge treatment.

2. The improvement as in claim 1, in which said mechanical pick-up means has suction members effective to engage the template at one surface thereof and thereby provide sole means for engagement of said template.

3. The improvement as in claim 1, in which said means for selectively acting against the belt for raising the template, comprises a bed plate at said station and having a plurality of movable fingers effective to operate between a retracted position within the surface of said plate and an extended position above the bed plate, said bed plate also having a plurality of vacuum openings for communicating with said membrane and thereby said glass template to clamp said template against said membrane during movement into and out of said station.

4. The improvement as in claim 3, in which said membrane is defined as a canvas fabric, and in which said fingers are each raised simultaneously by common table, said table being actuated by a force applied centrally beneath said table and having means for stabilizing the motion of said table.

5. The improvement as in claim 1, in which the sensing and shifting means comprises at least one locator assembly having a finger thereon fixed in said raised plane for obstructing any glass hangers upon said template as it is raised into said plane, said locator assembly being effective to stroke to a predetermined location for subsequent engagement by said template.

6. The improvement as in claim 5, in which said sensing and shifting means further comprises at least one positioning assembly having a wheel thereon effective to lie in said raised plane opposite an edge of said template from said locator assembly, said positioning assembly being effective to stroke a distance in excess of said movement of the locator assembly for effectively securing or straightening said template against said locator assembly.

* * * * *